(12) United States Patent
Sakai

(10) Patent No.: US 12,474,675 B2
(45) Date of Patent: Nov. 18, 2025

(54) EVALUATION METHOD AND ATOMIC CLOCK APPARATUS

(71) Applicant: SHIMADZU CORPORATION, Kyoto (JP)

(72) Inventor: Yuya Sakai, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 18/581,262

(22) Filed: Feb. 19, 2024

(65) Prior Publication Data

US 2024/0280942 A1     Aug. 22, 2024

(30) Foreign Application Priority Data

Feb. 20, 2023 (JP) ................. 2023-024185

(51) Int. Cl.
G04F 5/14 (2006.01)
H01S 3/00 (2006.01)
H03B 17/00 (2006.01)
H03L 7/26 (2006.01)

(52) U.S. Cl.
CPC .............. *G04F 5/14* (2013.01); *H01S 3/0057* (2013.01); *H03B 17/00* (2013.01); *H03L 7/26* (2013.01)

(58) Field of Classification Search
CPC ......... G04F 5/14; H01S 3/0057; H03B 17/00; H03L 7/26
USPC ....................................... 331/3, 94.1
See application file for complete search history.

(56) References Cited

FOREIGN PATENT DOCUMENTS

JP          2020-079854 A      5/2020
WO     WO-2016130025 A1  *  8/2016  ........... A61B 5/0071

\* cited by examiner

*Primary Examiner* — Arnold M Kinkead
(74) *Attorney, Agent, or Firm* — Muir Patent Law, PLLC

(57) ABSTRACT

An evaluation method evaluates characteristics of laser light in an optical apparatus. The optical apparatus includes a laser light source that emits laser light, a detector that detects laser light, and an optical shutter that switches between irradiation of the detector with laser light and cut-off of laser light to the detector. The evaluation method includes transmitting to the optical shutter, an instruction to switch between irradiation and cut-off, obtaining temporal change in quantity of light detected by the detector during a period from transmission of the instruction until completion of switching, and evaluating characteristics of laser light based on the obtained temporal change.

8 Claims, 11 Drawing Sheets

EVALUATION METHOD AND ATOMIC CLOCK APPARATUS

CROSS REFERENCE TO RELATED APPLICATIONS

This nonprovisional application is based on Japanese Patent Application No. 2023-024185 filed with the Japan Patent Office on Feb. 20, 2023, the entire contents of which are hereby incorporated by reference.

BACKGROUND OF THE INVENTION

Field of the Invention

The present disclosure relates to an evaluation method and an atomic clock apparatus, and more specifically to an evaluation method of evaluating characteristics of laser light in an optical apparatus and an atomic clock including a light source apparatus that emits laser light to be evaluated by the evaluation method.

Description of the Background Art

Japanese Patent Laying-Open No. 2020-79854 discloses a light source system for an atomic clock, the light source system generating laser light to be used in the atomic clock.

SUMMARY OF THE INVENTION

In an apparatus including a laser light source that emits laser light, such as an atomic clock apparatus, characteristics such as a position or an angle of laser light may vary due to heat or a pressure continuously applied to each component or a sudden impact caused by falling or contact. Variation in characteristics of laser light such as the position or the angle causes a malfunction of an apparatus such as an atomic clock apparatus that uses laser light. Therefore, characteristics of laser light should be evaluated.

Variation in characteristics of laser light may be sensed based on a signal from the apparatus. In order to evaluate how the characteristics of laser light have varied, however, laser light should visually be observed or a beam profile of laser light should be measured with a beam profiler.

In evaluation of laser light by visual observation, in an example where a light source is provided in a housing of the apparatus, the light source should be taken out by detaching the housing, which incurs cost for works. In evaluation by measurement of a beam profile, the beam profiler can be provided in the housing in advance, and hence such works as detachment of the housing are not required. The beam profiler, however, should be provided on an optical axis of laser light and an optical path for observation should separately be prepared, which increases cost or a size of the apparatus.

One of objects of the present disclosure is to provide a method of evaluating characteristics of laser light with cost and a size of an apparatus being suppressed.

An evaluation method in the present disclosure evaluates characteristics of laser light in an optical apparatus. The optical apparatus includes a laser light source that emits laser light, a detector that detects laser light, and an optical shutter that switches between irradiation of the detector with laser light and cut-off of laser light to the detector. The evaluation method includes transmitting to the optical shutter, an instruction to switch between irradiation and cut-off, obtaining temporal change in output from the detector during a period from transmission of the instruction until completion of switching, and evaluating characteristics of laser light based on the obtained temporal change.

An atomic clock apparatus in the present disclosure includes an atom generator that radiates atomic beams or ionized atoms, a plurality of light source apparatuses that irradiate the atoms radiated from the atom generator with laser light, a detector that detects laser light emitted from each of the plurality of light source apparatuses before the atoms are irradiated with laser light, and a control device. Each of the plurality of light source apparatuses includes a laser light source that emits laser light and an optical shutter that switches between irradiation of the detector with laser light and cut-off of laser light to the detector. For each of the plurality of light source apparatuses, the control device transmits to the optical shutter, an instruction to switch between irradiation and cut-off, obtains temporal change in output from the detector during a period from transmission of the instruction until completion of switching, and evaluates characteristics of laser light based on the obtained temporal change.

The foregoing and other objects, features, aspects and advantages of this invention will become more apparent from the following detailed description of this invention when taken in conjunction with the accompanying drawings.

DESCRIPTION OF THE PREFERRED EMBODIMENTS

Figure 1:
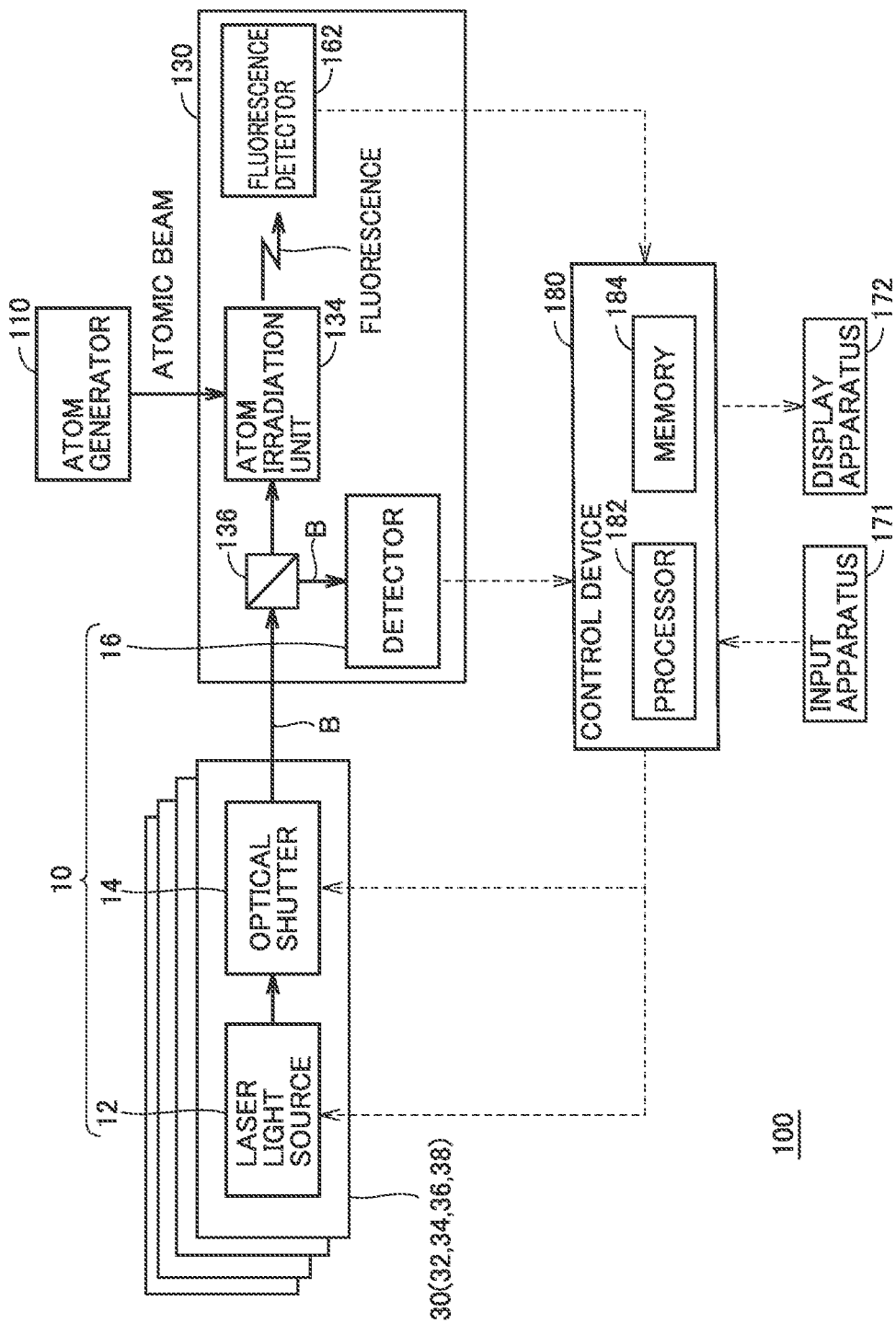
FIG. 1 is a schematic diagram showing a general configuration of an atomic clock apparatus.

An embodiment of the present disclosure will be described in detail below with reference to the drawings. The same or corresponding elements in the drawings have the same reference characters allotted and description thereof will not be repeated.

[Overall Configuration of Atomic Clock Apparatus]

FIG. 1 is a schematic diagram showing a general configuration of an atomic clock apparatus. An atomic clock apparatus 100 highly accurately detects a resonance frequency specific to atoms to count time, with a time period for a specific number of times of oscillation of undulations thereof being defined as one second. Atomic clock apparatus 100 includes an atom generator 110, a plurality of light source apparatuses 30, a vacuum container 130, an atom irradiation unit 134, a fluorescence detector 162, a detector 16, a control device 180, an input apparatus 171, and a display apparatus 172. The plurality of light source apparatuses 30 include a cooling light source 32, an excitation light source 34, a detection light source 36, and an optical lattice light source 38.

With atomic gas generated by heating of a base material of atoms such as strontium, ytterbium, or mercury being adopted as atomic beams, atom generator 110 radiates the atomic beams to atom irradiation unit 134 arranged in vacuum container 130.

Each of the plurality of light source apparatuses 30 radiates laser light B to vacuum container 130. Laser light may be referred to as "laser", a "beam", or a "laser beam," below. Laser light B radiated to vacuum container 130 is guided to atom irradiation unit 134 or detector 16 by an optical path switch 136. Though not shown, a plurality of optical path switches 136 and a plurality of detectors 16 are provided to correspond to respective light source apparatuses 30. Atomic clock apparatus 100 does not have to include the plurality of detectors 16 and it may include a single detector 16. For example, by controlling optical path switch 136, control device 180 may have detector 16 irradiated with a plurality of laser beams B emitted from respective light source apparatuses 30 one by one.

Light source apparatus 30 includes a laser light source 12 and an optical shutter 14. In other words, atomic clock apparatus 100 can also be defined as including an optical apparatus 10 composed at least of laser light source 12, optical shutter 14, and detector 16. Laser light source 12 emits laser light B. Optical shutter 14 is arranged on an optical path of laser light B emitted from laser light source 12 and switches between irradiation of detector 16 with laser light B emitted from laser light source 12 and cut-off of laser light B to detector 16. A mechanical shutter or an acousto-optic element can be employed as optical shutter 14.

Detector 16 is implemented, for example, by a photodiode, and it detects laser light B and outputs a detection value corresponding to a light quantity of laser light B to control device 180 as an output value. Since the output value outputted by detector 16 to control device 180 corresponds to the light quantity of laser light B, the output value is simply also referred to as the quantity of light below. A response speed of detector 16 is preferably high to such an extent that laser light can be detected a plurality of times during a period from start of switching between irradiation and cut-off by optical shutter 14 until completion of switching. Specifically, the response speed of detector 16 is preferably less than 1 ms and more specifically preferably not less than 0.1 μs. A result of detection by detector 16 is used for stabilization of the light quantity of laser light B or noise cancellation in transmission.

Atomic clock apparatus 100 is an optical lattice clock, and it creates optical lattices with laser light B emitted from optical lattice light source 38 and controlled to a specific wavelength called a "magic wavelength." The optical lattices are conceptual spatial interference fringes having recesses for an electric potential formed at regular intervals, and atoms are captured in the recesses.

Atomic clock apparatus 100 decelerates atoms in atomic beams by cooling atoms with laser light B emitted from cooling light source 32. Atomic clock apparatus 100 prevents interactions between atoms by having the optical lattice capture each decelerated atom one by one, the optical lattice being created by laser light B emitted from optical lattice light source 38. Atomic clock apparatus 100 irradiates atoms captured one by one in the optical lattices with laser light B emitted from excitation light source 34 to excite an energy level of atoms. After atomic clock apparatus 100 excites the energy level of atoms, it irradiates atoms with laser light B emitted from detection light source 36. Laser light B emitted from detection light source 36 generates fluorescence having intensity in proportion to an energy transition probability of atoms.

Fluorescence detector 162 receives fluorescence generated by detection light source 36 and detects intensity of received fluorescence. Fluorescence detector 162 outputs to control device 180, a transition probability spectrum dependent on an excitation laser frequency represented by the detected intensity of fluorescence. Control device 180 specifies the resonance frequency of atoms based on the transition probability spectrum received from fluorescence detector 162 and counts time based on the resonance frequency.

Referring again to FIG. 1, control device 180 includes a processor 182 and a memory 184. Processor 182 is, for example, a CPU, and it is a computing circuit that performs prescribed computing processing described in a program. Memory 184 includes a non-volatile memory or a volatile memory such as a read only memory (ROM) or a random access memory (RAM) and/or a mass storage such as a hard disc drive (HDD) or a solid state drive (SSD). Processor 182 reads the program and data stored in memory 184 and controls each component included in atomic clock apparatus 100 and performs prescribed processing upon receiving results of detection by detector 16 and fluorescence detector 162.

Input apparatus 171 and display apparatus 172 are connected to control device 180. Input apparatus 171 is implemented, for example, by a keyboard, a mouse, a pointing device, or a touch panel, and accepts an operation by a user. Display apparatus 172 is implemented, for example, by a liquid crystal display (LCD) or an organic electro luminescence (EL) display, and shows various types of information stored in memory 184.

Since atomic clock apparatus 100 is an apparatus that counts time, it should operate in a stable manner for a long time. In addition, atomic clock apparatus 100 is required to highly be accurate for control on an atomic level, and should monitor a state of each laser beam. In atomic clock apparatus 100 required to highly be accurate, detachment of the housing for visual evaluation of laser light not only incurs cost for works but also requires touching of the inside of the housing, which may lower accuracy in counting. In an example where a beam profiler is provided, an optical path for observation should be provided for each of the plurality of light source apparatuses 30, which will increase cost and the size of the apparatus.

A method that allows evaluation of characteristics of laser light while cost such as cost for works and cost for the apparatus and the size of the apparatus are suppressed has been demanded. A method of evaluating characteristics of laser light performed in atomic clock apparatus 100 will be described below.

[Evaluation Method]

Figure 2:
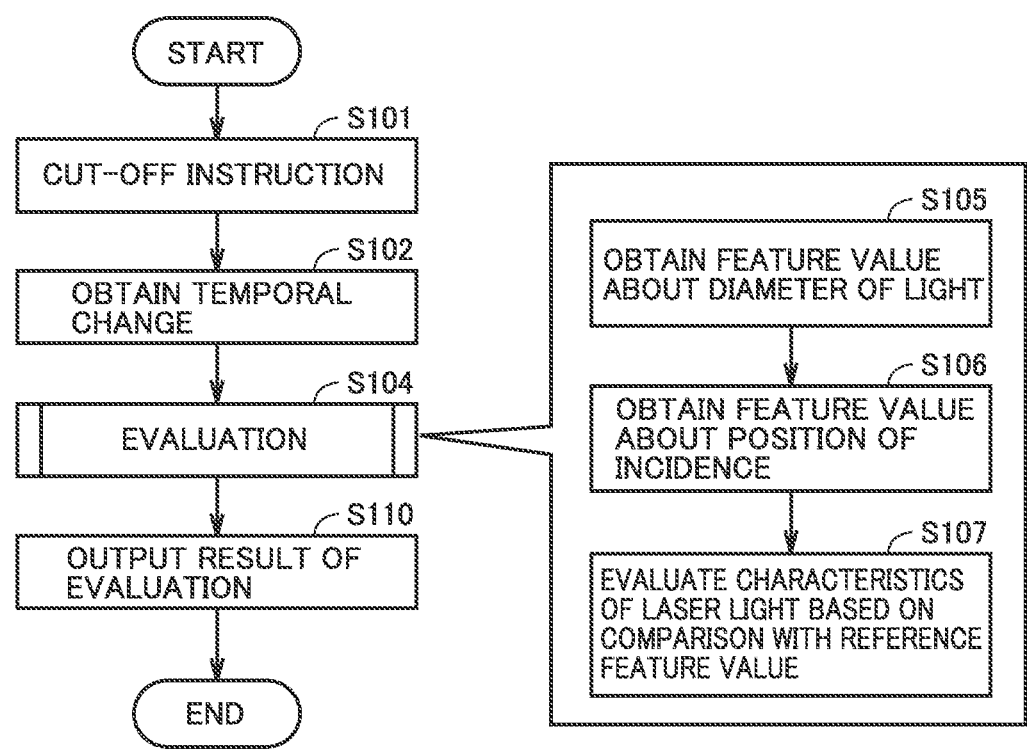
FIG. 2 is a flowchart of an evaluation method.

FIG. 2 is a flowchart of an evaluation method. Processing shown in FIG. 2 is performed, for example, by control device 180. A part or the entirety of the processing shown in FIG. 2 may be performed by another control device connected to control device 180. The processing shown in FIG. 2 is performed, for example, in prescribed cycles by way of example.

In S101, control device 180 transmits to optical shutter 14, an instruction to cut off irradiation of detector 16 with laser light.

In S102, control device 180 obtains a result of detection by detector 16 during a period from transmission of the instruction until completion of cut-off and obtains temporal change in quantity of light during the period from transmission of the instruction until completion of cut-off.

In S104, control device 180 evaluates characteristics of laser light based on obtained temporal change. When a position of incidence of laser light on optical shutter 14 or a range of irradiation with laser light varies while a shutter speed of optical shutter 14 remains unchanged, timing of start of cut-off of laser light or a time period required from start of cut-off of laser light until completion of cut-off of laser light varies. Therefore, control device 180 can evaluate characteristics of laser light based on temporal change in quantity of light during a period from transmission of a cut-off instruction until completion of cut-off.

In S104, control device 180 performs S105 to S107. In S105, control device 180 obtains a feature value about a light diameter of laser light B at optical shutter 14 based on obtained temporal change in quantity of light. In S106, control device 180 obtains a feature value about a position of incidence of laser light B on optical shutter 14 based on obtained temporal change in quantity of light. A specific method of obtaining the feature value will be described later with reference to FIG. 3 and later.

In S107, control device 180 compares a feature value defined as the reference and the found feature value with each other to evaluate the characteristics of laser light B. The feature value defined as the reference is each feature value found based on temporal change obtained at the timing when laser light is in a reference state. The feature value defined as the reference does not have to be found based on an actually measured value of temporal change, and it may be found by computation based on the shutter speed of optical shutter 14, a position of an optical axis of laser light, a light diameter of laser light, or the like. The reference state refers to a state when setting for obtaining desired characteristics of laser light has been made such as a state when setting of optical apparatus 10 is completed, a state at the time of completion of adjustment, and a state at the time of delivery.

In S110, control device 180 outputs a result of evaluation obtained in S104 and quits the process. The result is outputted, for example, to display apparatus 172, memory 184, or the like. Control device 180 may give a notification about an error or adjusts laser light based on the result of evaluation stored in memory 184.

By using the evaluation method as set forth above, in optical apparatus 10 in which laser light source 12, optical shutter 14, and detector 16 are arranged on the optical path of laser light, characteristics of laser light can be evaluated with the use of an optical component already provided in optical apparatus 10 and various costs such as cost for works and cost for the apparatus and the size of the apparatus can be suppressed. Since the characteristics of laser light can be monitored, atomic clock apparatus 100 can operate in a stable manner for a long time. Since detector 16 used for stabilization of the light quantity of laser light B or noise cancellation in transmission is used also for evaluation of characteristics of laser light, the cost for the apparatus can be suppressed.

In the example shown in FIG. 2, control device 180 makes evaluation based on temporal change in quantity of light obtained by output to optical shutter 14, of a signal indicating switching from irradiation to cut-off. Control device 180 may make evaluation based on temporal change in quantity of light obtained by output to optical shutter 14, of a signal indicating switching from cut-off to irradiation.

In S107, control device 180 compares the feature value defined as the reference and the found feature value with each other to evaluate characteristics of laser light B. Control device 180 may evaluate characteristics of laser light B based on the found feature value. For example, control device 180 may evaluate characteristics such as the diameter of light and a position of incidence of laser light B based on an actually measured value such as the feature value about the diameter of light and the feature value about the position of incidence and a setting value of optical apparatus 10 such as the shutter speed of optical shutter 14.

Though control device 180 makes evaluation in S107 based on temporal change defined as the reference, it may evaluate characteristics of laser light based on comparison of temporal changes in quantity of light obtained at different timings. Control device 180 can thus evaluate how the characteristics have varied.

[Result of Evaluation Obtained from Temporal Change in Quantity of Light]

A result of evaluation obtained from temporal change in quantity of light will be described. Since a mechanical shutter or an acousto-optic element can be employed as optical shutter 14, relation between a waveform representing temporal change in quantity of light and beam characteristics and a result of evaluation obtained from temporal change in quantity of light in an example where a mechanical shutter 142 is employed as optical shutter 14 and an example where an acousto-optic element 144 is employed as optical shutter 14 will be described below. An output value (quantity of light) obtained in a state before (or at the time of) issuance of an opening and closing instruction to optical shutter 14 is referred to as an initial value, and an output value (quantity of light) obtained when optical shutter 14 is completely closed or opened upon reception of the opening and closing instruction is referred to as an end value. Since description will be given below assuming that a cut-off instruction is issued to optical shutter 14, the initial value corresponds to the output value (quantity of light) obtained when optical shutter 14 is fully open and the end value corresponds to the output value (quantity of light) obtained when laser light B is completely cut off by optical shutter 14. When an extent of fluctuation of the quantity of light becomes equal to or smaller than a prescribed value and attains to a steady value within a predetermined period after start of change in quantity of light, laser light B can be determined as having completely been cut off by optical shutter 14.

(Mechanical Shutter)

Figure 3:
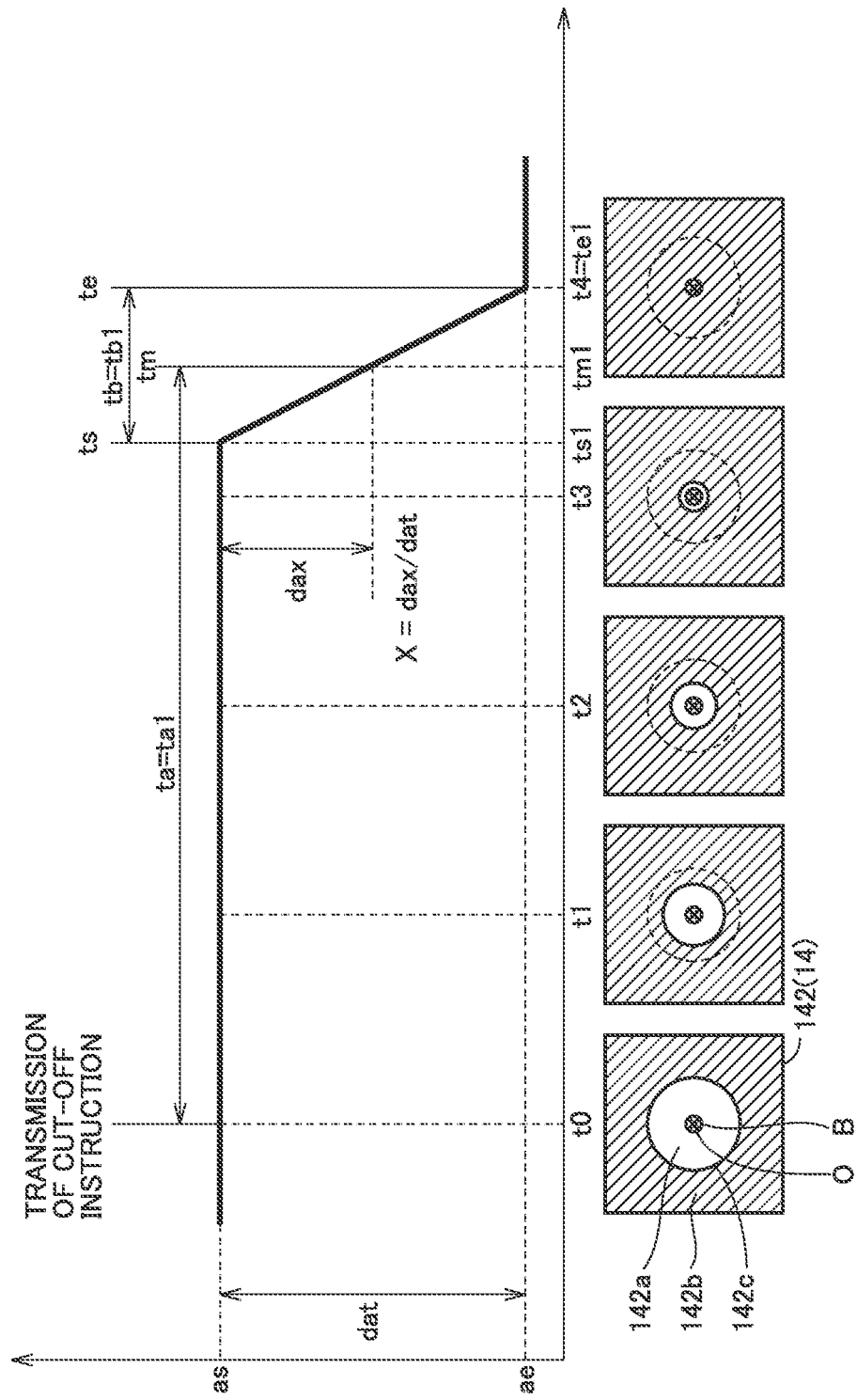
FIGS. 3 and 4 are each a diagram showing a waveform representing temporal change in quantity of light and a state from start of cut-off until completion of cut-off.
Figure 4:
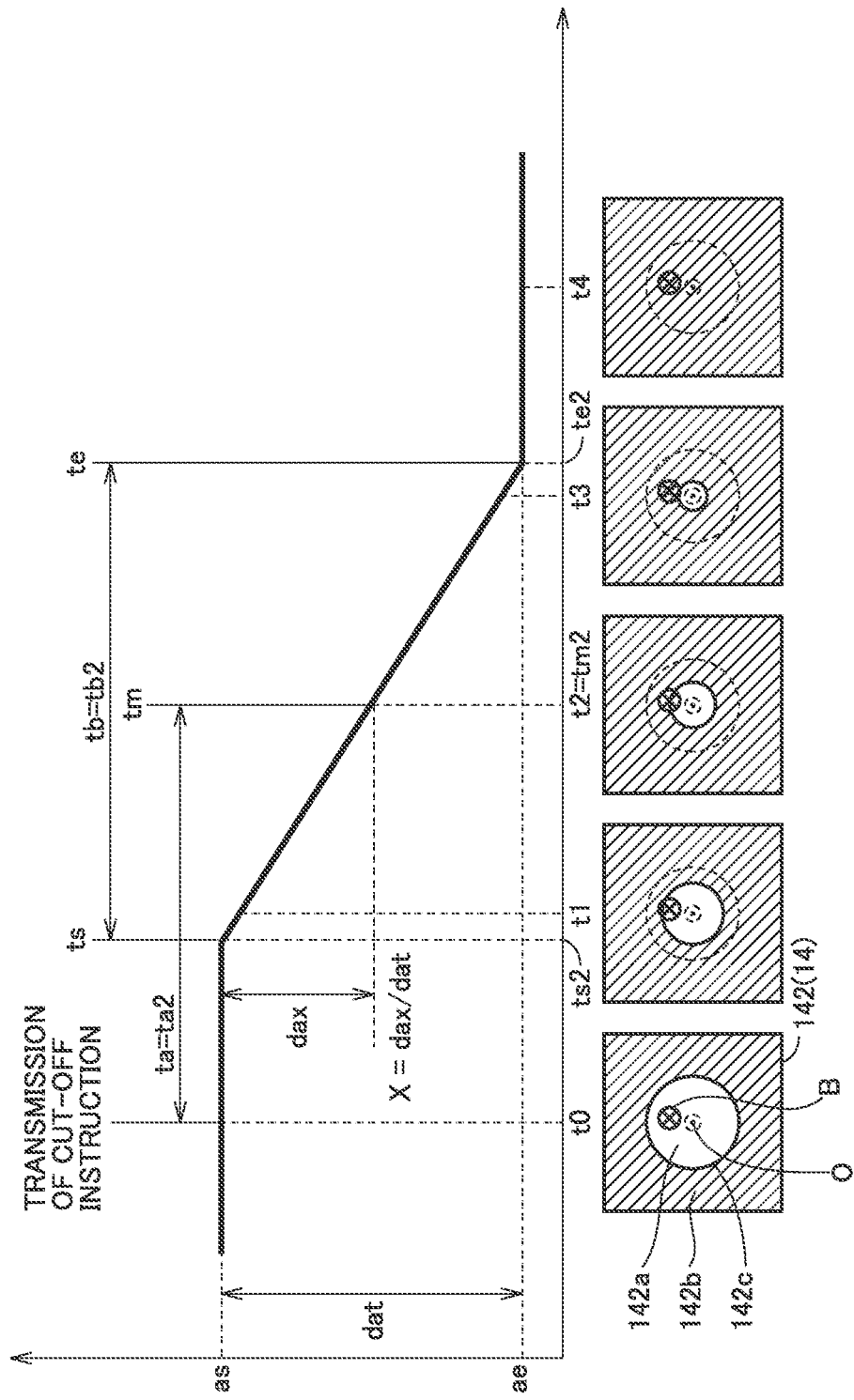

Relation between the waveform representing temporal change in quantity of light and the beam characteristics when mechanical shutter 142 is employed as optical shutter 14 will be described with reference to FIGS. 3 and 4. FIGS. 3 and 4 are each a diagram showing the waveform representing temporal change in quantity of light and a state from start of cut-off until completion of cut-off. For the waveforms in FIGS. 3 and 4, the abscissa represents time and the ordinate represents the light quantity of laser light B detected by detector 16. The waveform shown in FIG. 3 is obtained in the reference state in which a beam is arranged at a reference position and a beam diameter has a size within a defined range. The waveform shown in FIG. 4, on the other hand, is obtained in an abnormal state in which the position of the beam and the beam diameter deviate from those in the reference state.

Mechanical shutter 142 shown in FIGS. 3 and 4 is an aperture type shutter, and includes an outer frame 142b provided with a circular opening 142a and an aperture 142c. Mechanical shutter 142 can concentrically increase or decrease the size of opening 142a or close opening 142a, by concentrically opening or closing aperture 142c. Mechanical shutter 142 allows irradiation of detector 16 with laser light B by opening aperture 142c and cuts off irradiation of detector 16 with laser light B by closing aperture 142c to close opening 142a. Description will be given with reference to FIGS. 3 and 4, assuming that the cut-off instruction is issued to mechanical shutter 142. Since mechanical shutter 142 and detector 16 are distant from each other, there is time lag until detector 16 detects light that passes through mechanical shutter 142. For the sake of brevity of description, however, the quantity of light at each timing shown in FIGS. 3 and 4 will be described as corresponding to the state of mechanical shutter 142 at each timing.

Referring to FIG. 3, in the reference state, mechanical shutter 142 is arranged such that laser light B passes through a center O of opening 142a. It is assumed that control device 180 transmits the cut-off instruction to mechanical shutter 142 at timing t0. Upon receiving the instruction from control device 180, mechanical shutter 142 gradually closes aperture 142c from timing t0 toward timing t1, timing t2, timing t3, and timing t4. With such closing, opening 142a becomes smaller and is fully closed at timing t4.

Relation between opening 142a (or aperture 142c) and laser light B will now be described. Even when opening 142a is made smaller, laser light B is not cut off by aperture 142c for some time because there is a distance from aperture 142c to an outer circumference of laser light B. Therefore, the quantity of light does not vary until timing ts1. Thereafter, when aperture 142c starts to cut off laser light B, the quantity of light that reaches detector 16 decreases and the quantity of light gradually decreases. When aperture 142c fully closes opening 142a at time t4, laser light B is completely cut off and a detection value from detector 16 is minimized.

The waveform representing temporal change in quantity of light in the abnormal state will be described with reference to FIG. 4. In the abnormal state shown in FIG. 4, a position where laser light B passes is displaced from center O of opening 142a. The light diameter of laser light B is larger than the light diameter of laser light B in the reference state. The states of aperture 142c at timing t0 to timing t4 in FIG. 4 are the same as the states of aperture 142c at timing t0 to timing t4 in FIG. 3, respectively.

The position where laser light B passes is located at a position displaced from center O of opening 142a. Therefore, the distance from aperture 142c to the outer circumference of laser light B when aperture 142c is maximally opened is shorter in the abnormal state than in the reference state. Therefore, in the abnormal state, at timing t1, some of laser light B is cut off by aperture 142c. At timing t3 before mechanical shutter 142 completely cuts off laser light B, laser light B is substantially cut off. At timing te2 before timing t4 when opening 142a is fully closed, laser light B is completely cut off and the detection value detected by detector 16 is minimized.

A delay time period ta from timing t0 of transmission of the cut-off instruction by control device 180 until timing tm when the quantity of light has varied by a prescribed ratio will be described. Timing tm when the quantity of light has varied by the prescribed ratio is timing when a ratio of an amount of change dax from an initial value as of the quantity of light (the quantity of light at timing t0) to a total amount of change dat from initial value as of the quantity of light until an end value ae attains to the prescribed ratio. In other words, delay time period ta can also be expressed as a period from timing t0 of transmission of the cut-off instruction by control device 180 until timing tm at which a rate of change X in quantity of light attains to a prescribed value, where rate of change X represents a ratio of amount of change dax from the initial value to total amount of change dat. In the example shown in FIGS. 3 and 4, timing when rate of change X in quantity of light attains to 50% is defined as timing tm. Timing when rate of change X in quantity of light attains to the prescribed value should only be later than timing ts when the quantity of light starts to vary, and any prescribed value can be set.

The quantity of light is reduced by half by shielding by aperture 142c, of a prescribed range in a range of incidence of laser light B. Delay time period ta is determined by an area of laser light B (which is also simply referred to as a "shielded area" below) shielded per unit time and a position of incidence of laser light B on mechanical shutter 142. In other words, when the shield area per unit time is the same between the abnormal state and the reference state, delay time period ta corresponds to a feature value corresponding to the position of incidence of laser light B on mechanical shutter 142. Therefore, when the shielded area per unit time is the same between the abnormal state and the reference state, control device 180 can evaluate how much the position of incidence is displaced in the abnormal state based on comparison between a delay time period ta1 (a time period from timing t0 until timing tm1) in the reference state and a delay time period ta2 (a time period from timing t0 until timing tm2) in the abnormal state.

In the present embodiment, the shielded area per unit time is different between the abnormal state and the reference state. This is because laser light B is cut off from the outer circumference thereof in the reference state whereas laser light B is cut off in one direction in the abnormal state, as shown in a lower tier in each of FIGS. 3 and 4. Then, control device 180 may obtain the rate of change (inclination) in quantity of light as the feature value that represents the shielded area per unit time and may correct delay time period ta with the rate of change (inclination) in quantity of light. Control device 180 may adopt a corrected delay time period ta' as the feature value corresponding to the position of incidence of laser light B on mechanical shutter 142. Control device 180 may evaluate how much the position of incidence is displaced in the abnormal state based on comparison between a corrected delay time period ta'1 in the reference state and a corrected delay time period ta'2 in the abnormal state.

A change time period tb from timing ts of start of cut-off of laser light B by aperture 142c until timing te of complete cut-off of laser light B will be described. Timing ts is timing when rate of change X is 0% and timing te is timing when rate of change X is 100%, where rate of change X represents a ratio of amount of change dax from initial value as to total amount of change dat. In other words, change time period tb can also be expressed as a time period within which rate of change X increases from a first value to a second value during a period from start of change in quantity of light until the quantity of light attains to end value ae. Though the first value and the second value are set to 0% and 100% in the examples shown in FIGS. 3 and 4, respectively, any value can be set.

Change time period tb is determined by the shielded area per unit time and the diameter of light at the position of incidence of laser light B. In other words, when the shielded area per unit time is the same between the abnormal state and the reference state, change time period tb corresponds to the feature value corresponding to the diameter of light at the position of incidence of laser light B. Therefore, when the shielded area per unit time is the same between the abnormal state and the reference state, control device 180 can evaluate change in diameter of light at the position of incidence of laser light B based on comparison between a change time period tb1 (a time period from timing ts1 until timing te1) in the reference state and a change time period tb2 (a time period from timing ts2 until timing te2) in the abnormal state.

In the present embodiment, the shielded area per unit time is different between the abnormal state and the reference state. Control device 180 may obtain the rate of change (inclination) in quantity of light as the feature value representing the shielded area per unit time and correct change time period tb with the rate of change (inclination) in quantity of light. Control device 180 may adopt a corrected change time period tb' as the feature value corresponding to the diameter of light at the position of incidence of laser light B. Control device 180 may evaluate how the diameter of light has varied in the abnormal state based on comparison between a corrected change time period tb'1 in the reference state and a corrected change time period tb'2 in the abnormal state.

(Acousto-Optic Element)

Figure 5:
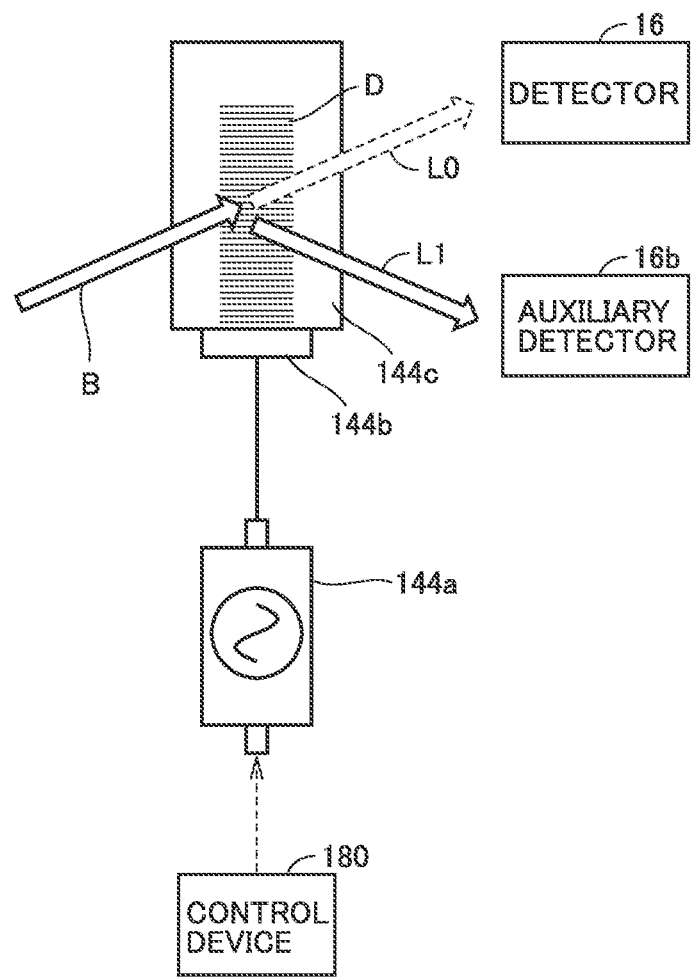
FIG. 5 is a diagram for illustrating a structure of an acousto-optic element.
Figure 6:
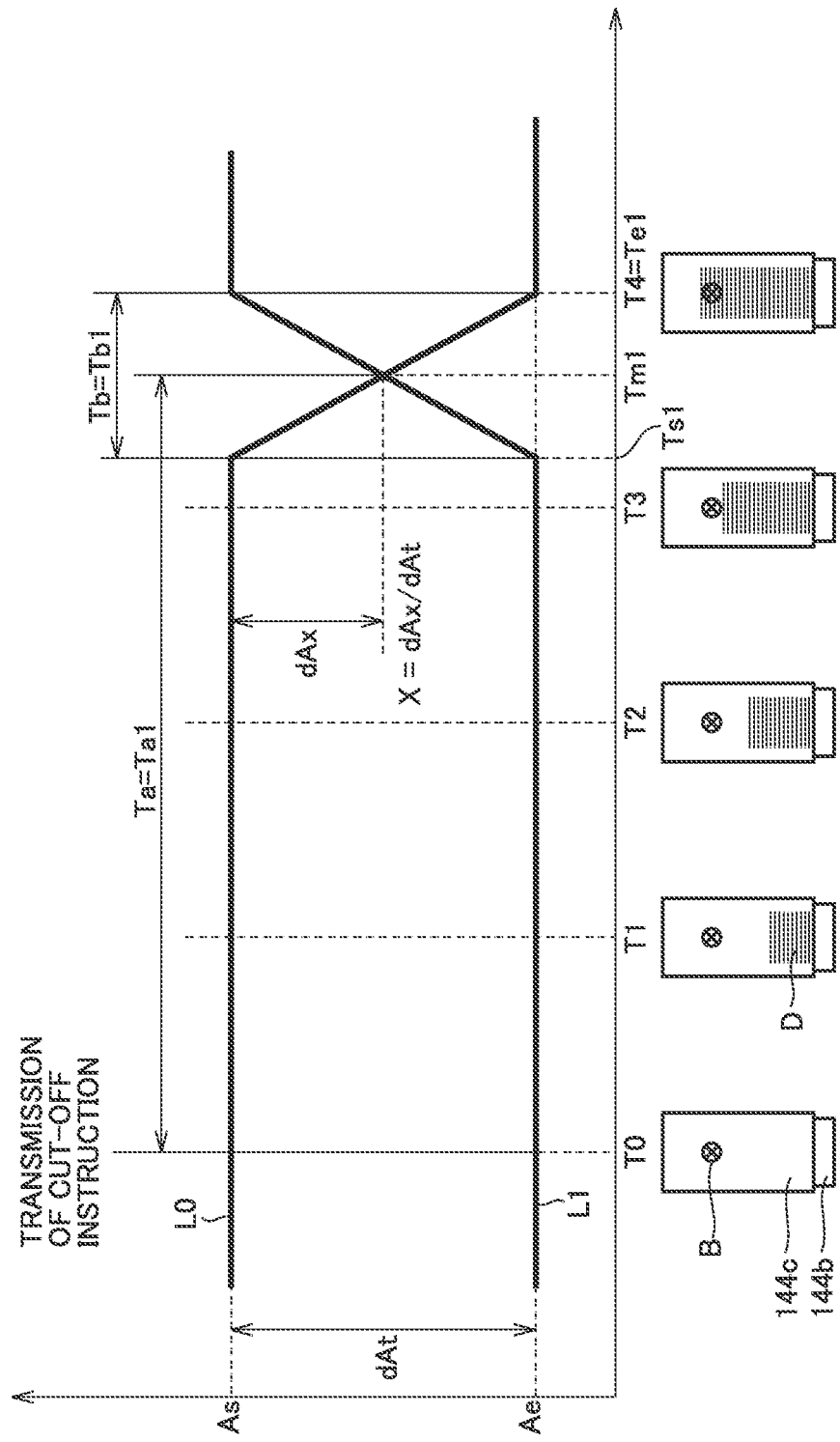
FIGS. 6 and 7 are each a diagram showing a waveform representing temporal change in quantity of light and a state from start of cut-off until completion of cut-off.
Figure 7:
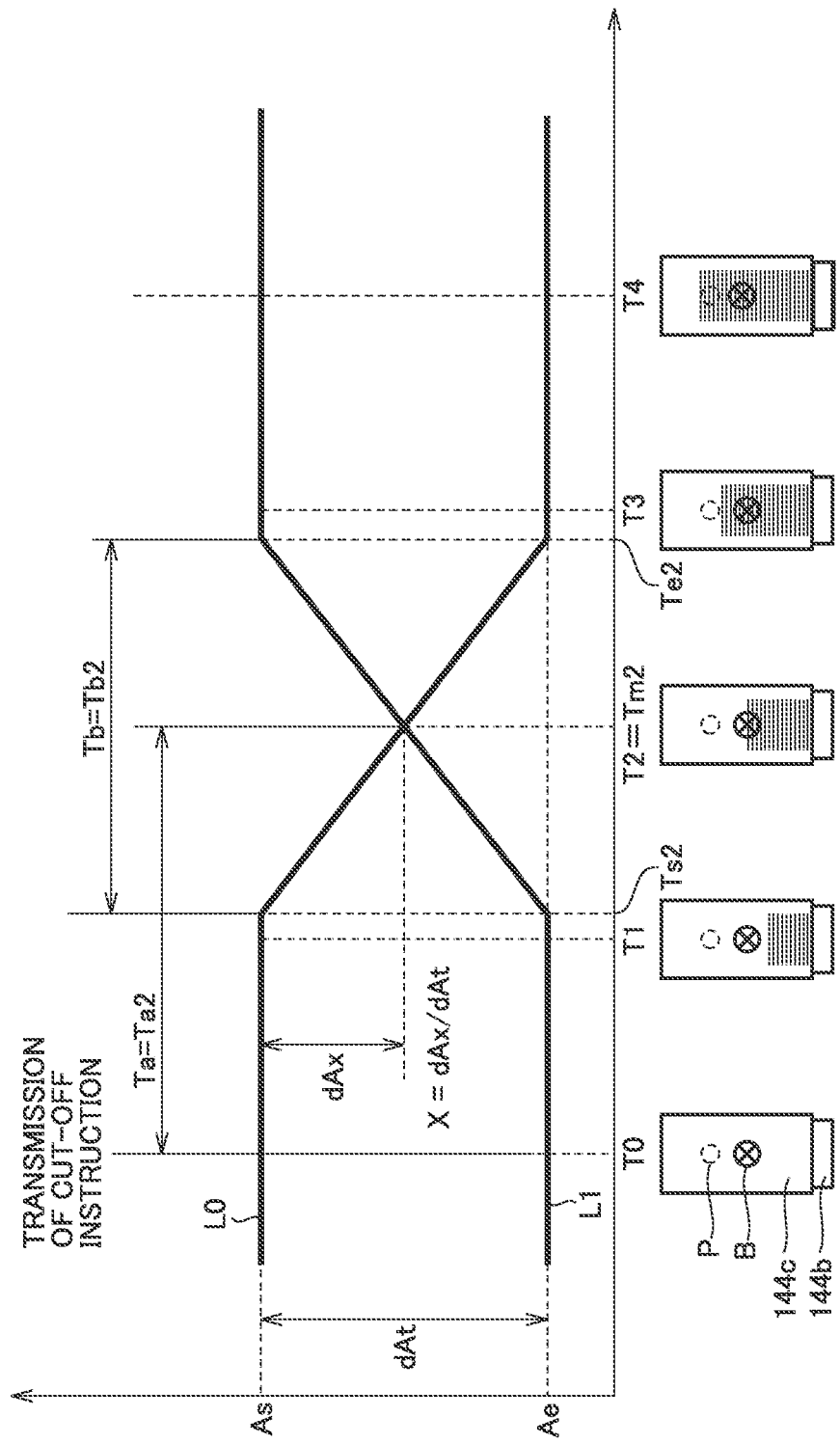

Relation between the waveform representing temporal change in quantity of light and beam characteristics when acousto-optic element 144 is employed as optical shutter 14 will be described. FIG. 5 is a diagram for illustrating a structure of the acousto-optic element. FIGS. 6 and 7 are each a diagram showing the waveform representing temporal change in quantity of light and a state from start of cut-off until completion of cut-off. For the waveforms in FIGS. 6 and 7, the abscissa represents time and the ordinate represents the light quantity of laser light B detected by detector 16. The waveform shown in FIG. 6 is obtained in the reference state in which a beam is arranged at the reference position and a beam diameter has a size within a defined range. The waveform shown in FIG. 7, on the other hand, is obtained in the abnormal state in which the position of the beam and the beam diameter deviate from those in the reference state.

Referring to FIG. 5, acousto-optic element 144 includes an RF signal generation circuit 144a, a piezoelectric element 144b, and an acousto-optic crystal 144c. Upon receiving a control instruction from control device 180, RF signal generation circuit 144a generates an RF signal and sends the RF signal to piezoelectric element 144b. When the RF signal reaches piezoelectric element 144b, acoustic waves are generated from piezoelectric element 144b and propagate through acousto-optic crystal 144c. Upon receiving acoustic waves, acousto-optic crystal 144c becomes a diffraction grating D owing to an acousto-optic effect. When acoustic waves reach a position irradiated with laser light B, laser light B is diffracted. Transmitted light L0 that has passed through acousto-optic crystal 144c is detected by detector 16. Diffracted light L1 diffracted by acousto-optic crystal 144c is detected by an auxiliary detector 16b.

In other words, as acoustic waves propagate through acousto-optic crystal 144c, irradiation of detector 16 with laser light B is cut off and auxiliary detector 16b is irradiated with laser light B. As propagation of acoustic waves through acousto-optic crystal 144c is stopped, detector 16 is irradiated with laser light B and irradiation of auxiliary detector 16b with laser light B is cut off.

As set forth above, acousto-optic element 144 switches between irradiation of detector 16 or auxiliary detector 16b with laser light and cut-off of laser light. Acoustic waves gradually propagate through acousto-optic crystal 144c, and as acoustic waves propagate through all areas in acousto-optic crystal 144c where laser light B is incident, cut-off or irradiation is completed. By obtaining temporal change in quantity of light detected by detector 16 or auxiliary detector 16b during a period from issuance of the instruction to switch between irradiation and cut-off until propagation of acoustic waves to the all areas, the position of laser light B that passes through acousto-optic crystal 144c and the light diameter of laser light B are evaluated.

Description will be given with reference to FIGS. 6 and 7, assuming that control device 180 issues to acousto-optic element 144, an instruction to cut off irradiation of detector 16 with laser light B. FIGS. 6 and 7 show temporal change in light quantity of transmitted light L0 detected by detector 16 and diffracted light L1 detected by auxiliary detector 16b. Since acousto-optic element 144 is distant from detector 16 and auxiliary detector 16b, there is time lag until detector 16 and auxiliary detector 16b detect light that passes through acousto-optic element 144. For the sake of brevity of description, however, description will be given assuming that the quantity of light at each timing shown in FIGS. 6 and 7 corresponds to a state of acousto-optic element 144 at each timing.

The waveform representing temporal change in quantity of light in the reference state will be described with reference to FIG. 6. At timing T0, control device 180 is assumed to have transmitted to acousto-optic element 144, an instruction to cut off irradiation of detector 16 with laser light B. Upon receiving the instruction from control device 180, RF signal generation circuit 144a generates the RF signal, acoustic waves are generated from piezoelectric element 144b, and acousto-optic crystal 144c becomes diffraction grating D upon receiving acoustic waves. As acoustic waves propagate through acousto-optic crystal 144c, a range of diffraction grating D gradually expands from a side of piezoelectric element 144b from timing T0 to timing T1, timing T2, timing T3, and timing T4, and the all areas including the positions irradiated with laser light B become diffraction grating D at timing T4.

Though acoustic waves gradually propagate through acousto-optic crystal 144c, at timing T3, acoustic waves have not yet reached the position of irradiation with laser light B. Since laser light B is not diffracted at timing T3, the light quantity of transmitted light L0 does not vary and the detection value of diffracted light L1 does not vary either. Thereafter, when acoustic waves reach an end of the positions irradiated with laser light B at timing Ts1, some of laser light B is diffracted. With expansion of the range of diffraction grating D, the light quantity of transmitted light L0 decreases and the light quantity of diffracted light L1 increases. Thereafter, when the all areas including the positions irradiated with laser light B become diffraction grating D at timing T4, laser light B incident on acousto-optic crystal 144c is completely diffracted, the detection value of transmitted light L0 detected by detector 16 is minimized, and the light quantity of diffracted light L1 detected by auxiliary detector 16b is maximized.

The waveform representing temporal change in quantity of light in the abnormal state will be described with reference to FIG. 7. In the abnormal state shown in FIG. 7, the position of incidence of laser light B is closer to piezoelectric element 144b than a position of incidence P in the reference state. The light diameter of laser light B is larger than the light diameter of laser light B in the reference state. Ranges of diffraction grating D at timing T0 to timing T4 in FIG. 7 are the same as the ranges of diffraction grating D at timing T0 to timing T4 in FIG. 6, respectively.

The position of incidence of laser light B is closer to piezoelectric element 144b than position of incidence P in the reference state. Therefore, in the abnormal state, some of laser light B is diffracted at timing Ts2. At timing T3, laser light B has already completely been diffracted.

A delay time period Ta from timing T0 of transmission of the cut-off instruction by control device 180 until timing Tm when the quantity of light has varied by a prescribed ratio will be described with reference to the graph of temporal change in transmitted light L0. Timing Tm when the quantity of light has varied by the prescribed ratio is timing when a ratio of an amount of change dAx from an initial value As of the quantity of light (the quantity of light at timing T0) to a total amount of change dAt from initial value As of the quantity of light until an end value Ae attains to the prescribed ratio. In other words, delay time period Ta can also be expressed as a period from timing T0 of transmission of the cut-off instruction by control device 180 until timing Tm when rate of change X in quantity of light attains to a prescribed value where rate of change X represents a ratio of amount of change dAx from the initial value to total amount of change dAt. In the examples shown in FIGS. 6 and 7, timing when rate of change X in quantity of light attains to 50% is defined as timing Tm. Timing when the rate of change in quantity of light attains to the prescribed value should only be later than timing Ts when the quantity of light starts to vary, and any prescribed value can be set.

The quantity of light is reduced by half when diffraction grating D reaches the center of the optical axis of laser light B. Therefore, delay time period Ta from timing T0 until timing Tm when the quantity of light is reduced by half is a time period until diffraction grating D reaches the center of the optical axis of laser light B and corresponds to the feature value corresponding to the position of incidence of laser light B on acousto-optic element 144. Control device 180 can evaluate how much the position of incidence is displaced in the abnormal state based on comparison between a delay time period Ta2 (a time period from timing T0 until timing Tm2) in the abnormal state and a delay time period Ta1 (a time period from timing T0 until timing Tm1) in the reference state.

A change time period Tb from timing Ts when laser light B starts to be diffracted until timing Te when laser light B is completely diffracted will be described with reference to the graph of temporal change in transmitted light L0. Timing Ts is timing when rate of change X is 0% and timing Te is timing when rate of change X is 100%, where rate of change X represents a ratio of amount of change dAx from initial value As to total amount of change dAt. In other words, change time period Tb can also be expressed as a time period within which rate of change X increases from a first value to a second value during a period from start of change in quantity of light until the quantity of light attains to end value Ae. Though the first value and the second value are set to 0% and 100% in the examples shown in FIGS. 6 and 7, respectively, any value can be set.

Acousto-optic element 144 gradually becomes diffraction grating D in one direction with propagation of acoustic waves therethrough. Since a speed of propagation of acoustic waves does not vary in spite of variation in characteristics of laser light, change time period Tb corresponds to the feature value corresponding to the diameter (the diameter of light at the position of incidence) of laser light B. Control device 180 can evaluate how much the diameter of light has varied in the abnormal state based on comparison between a change time period Tb2 (a time period from timing Ts2 until timing Te2) in the abnormal state and a change time period Tb1 (a time period from timing Ts1 until timing Te1) in the reference state.

As set forth above, in an example where any optical shutter 14 of mechanical shutter 142 and acousto-optic element 144 is employed, when characteristics of laser light such as the position of passage of laser light B and the light diameter of laser light B vary, delay time period Ta from transmission of the instruction until change in quantity of light by a prescribed ratio or change time period Tb required from start of cut-off of laser light B until complete cut-off varies. How characteristics of laser light have varied can be evaluated by periodically obtaining data on temporal change in quantity of light, obtaining the delay time period or the change time period based on the data on temporal change in quantity of light, and comparing the delay time period or the change time period with the delay time period or the change time period in the reference state.

Though description is given above with reference to transmitted light L0 by way of example, characteristics of laser light can be evaluated also by calculation of the delay time period and the change time period similarly from temporal change in diffracted light L1.

[Modification of Optical Apparatus]

The optical apparatus is described as including a single optical shutter with reference to FIGS. 3 to 7. The optical apparatus may include a plurality of optical shutters 14. A method of evaluating laser light emitted from an optical apparatus including a plurality of optical shutters will be described below.

Figure 8:
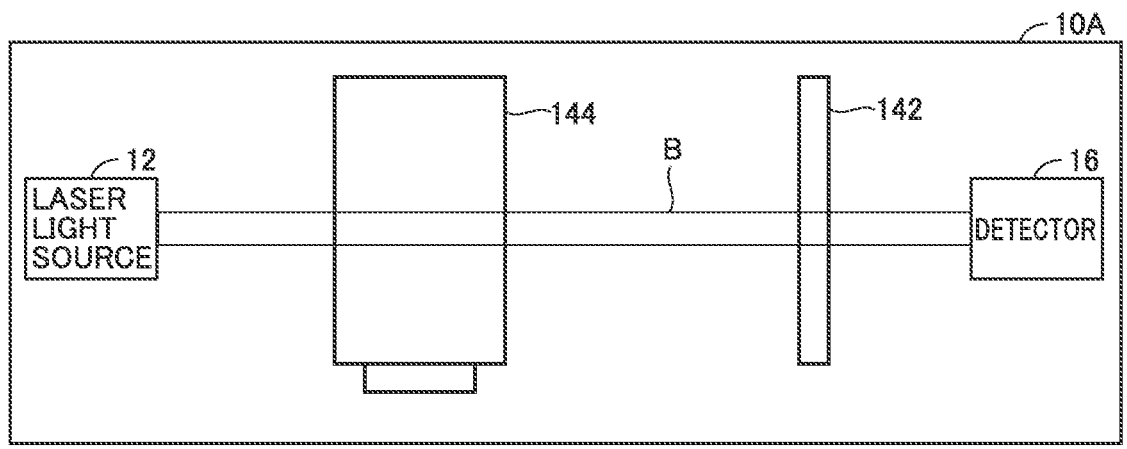
FIG. 8 is a schematic diagram showing a general configuration of an optical apparatus according to a modification.

FIG. 8 is a schematic diagram showing a general configuration of an optical apparatus according to a modification. An optical apparatus 10A is common in configuration to optical apparatus 10 shown in FIG. 1 except for including mechanical shutter 142 and acousto-optic element 144 instead of optical shutter 14. In optical apparatus 10A, laser light B emitted from laser light source 12 passes sequentially through acousto-optic element 144 and mechanical shutter 142 and is detected by detector 16. Description will be given below, assuming that control device 180 sends a cut-off instruction to acousto-optic element 144 so that acousto-optic element 144 becomes the diffraction grating to diffract laser light B incident thereon to thereby cut off irradiation of detector 16.

Figure 9:
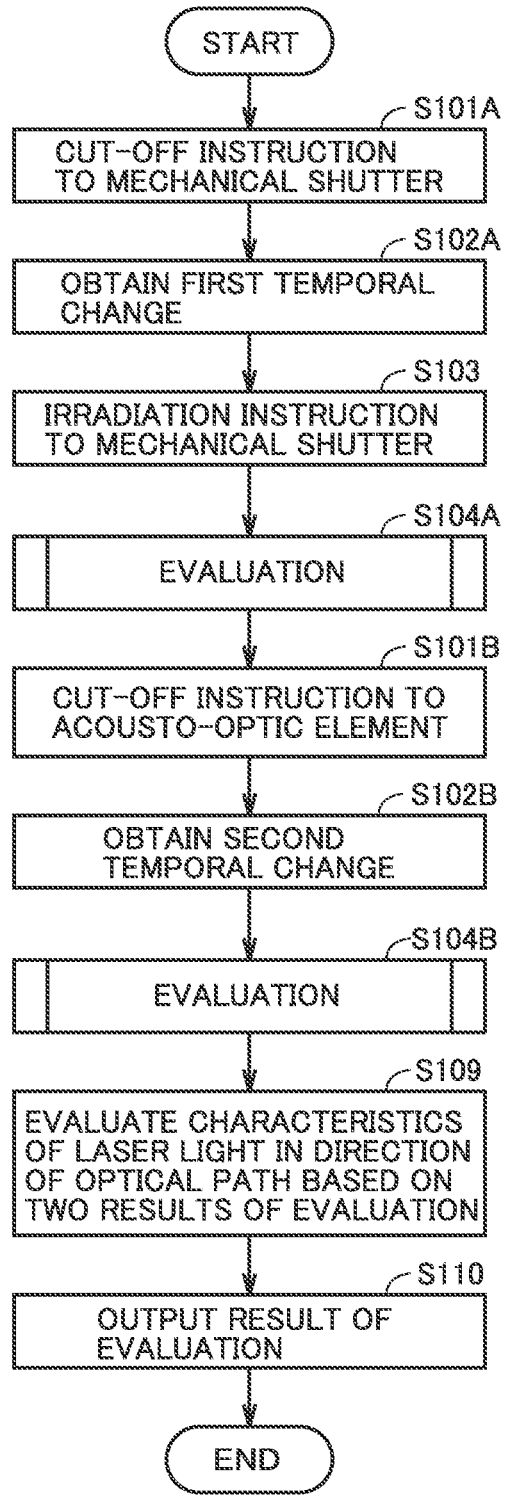
FIG. 9 is a flowchart of an evaluation method according to the modification.

FIG. 9 is a flowchart of an evaluation method according to the modification. Processing shown in FIG. 9 is performed, for example, by control device 180. A part or the entirety of the processing shown in FIG. 9 may be performed by another control device connected to control device 180. The processing shown in FIG. 9 is performed, for example, in prescribed cycles by way of example. The processing shown in FIG. 9 is performed when detector 16 is irradiated with laser light B.

In S101A, control device 180 transmits to mechanical shutter 142, an instruction to cut off irradiation of detector 16 with laser light. At this time, control device 180 does not send the instruction for cut-off to acousto-optic element 144. In other words, control device 180 controls each optical shutter such that mechanical shutter 142 is closed while acousto-optic element 144 is inactive.

In S102A, control device 180 obtains a result of detection by detector 16 during a period from transmission of the instruction to mechanical shutter 142 until completion of cut-off and obtains first temporal change in quantity of light during the period from transmission of the instruction until completion of cut-off.

In S103, control device 180 transmits to mechanical shutter 142, an instruction to irradiate detector 16 with laser light.

In S104A, control device 180 evaluates characteristics of laser light based on obtained first temporal change in quantity of light. Control device 180 evaluates the position of incidence on mechanical shutter 142 and the light diameter of laser light B at the position of incidence on mechanical shutter 142 based on first temporal change in quantity of light. Since the evaluation method is as described above, description will not be repeated.

In S101B, control device 180 transmits to acousto-optic element 144, an instruction to cut off irradiation of detector 16 with laser light. At this time, control device 180 does not send mechanical shutter 142 the instruction for cut-off. In other words, control device 180 controls each optical shutter such that acousto-optic element 144 is active while mechanical shutter 142 is open.

In S102B, control device 180 obtains a result of detection by detector 16 during a period from transmission of the instruction to acousto-optic element 144 until completion of cut-off and obtains second temporal change in quantity of light during the period from transmission of the instruction until completion of cut-off.

In S104B, control device 180 evaluates characteristics of laser light based on obtained second temporal change in quantity of light. Control device 180 evaluates the position of incidence on acousto-optic element 144 and the light diameter of laser light B at the position of incidence on acousto-optic element 144 based on second temporal change in quantity of light. Since the evaluation method is as described above, description will not be repeated.

In S109, control device 180 evaluates characteristics of laser light in a direction of the optical path of laser light B based on comparison between the result of evaluation obtained in S104A and the result of evaluation obtained in S104B. Specifically, control device 180 evaluates how the light diameter of laser light B varies along a direction of emission of laser light B and how the optical axis of laser light B is displaced. A specific evaluation method will be described later with reference to FIGS. 10 to 13.

In S110, control device 180 outputs a result of evaluation and quits the process. Control device 180 outputs the result of evaluation obtained in each of S104A, S104B, and S109.

[Result of Evaluation Obtained Based on Comparison Between Two Results of Evaluation]

The result of evaluation of characteristics of laser light in the direction of optical path obtained based on comparison between the result of evaluation obtained from first temporal change in quantity of light and the result of evaluation obtained from second temporal change in quantity of light will be described with reference to FIGS. 10 to 13. First temporal change is temporal change obtained when only mechanical shutter 142 is closed and second temporal change is temporal change obtained when only acousto-optic element 144 is activated.

Figure 10:
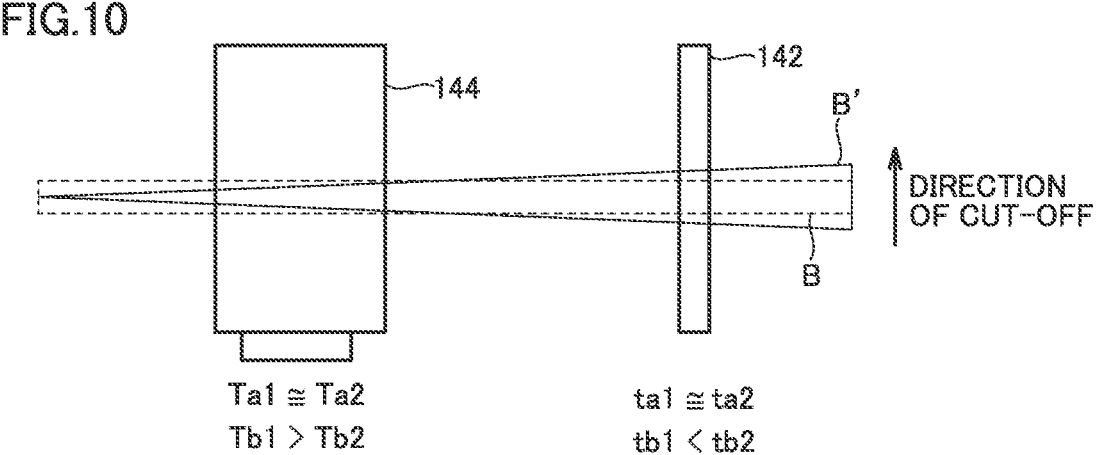
FIG. 10 is a schematic diagram showing a state when laser light is diffused.
Figure 11:
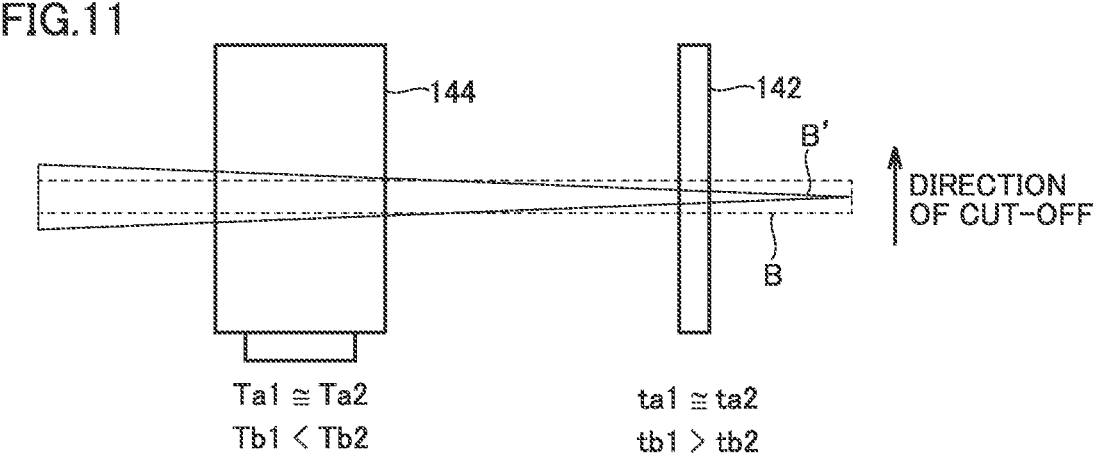
FIG. 11 is a schematic diagram showing a state when laser light is converged.
Figure 12:
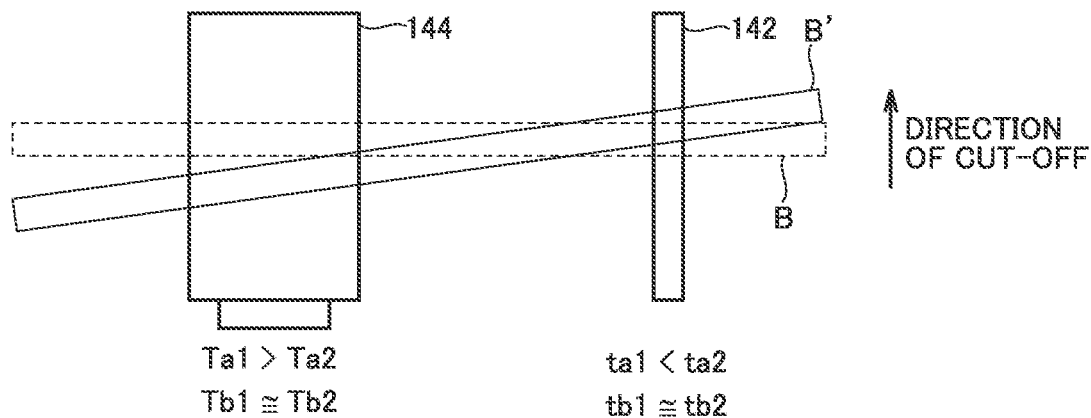
FIG. 12 is a schematic diagram showing a state when an optical axis of laser light is skewed.
Figure 13:
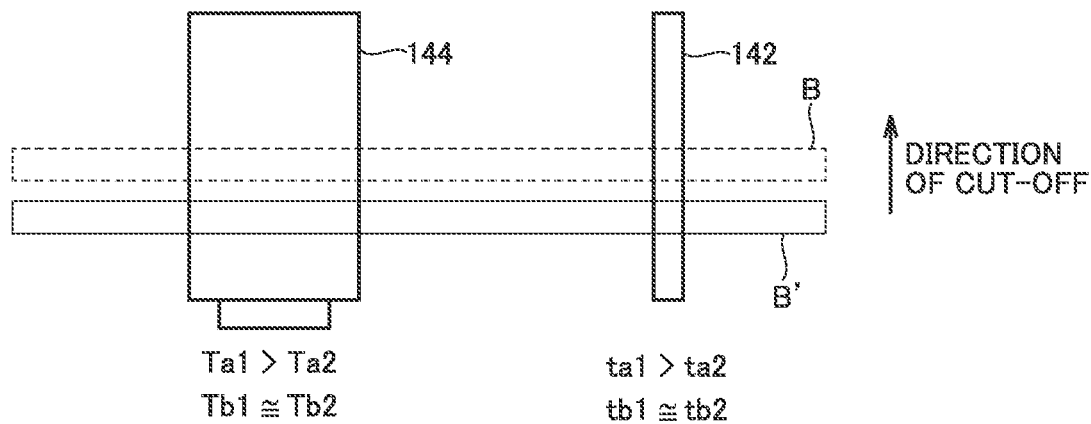
FIG. 13 is a schematic diagram showing a state when the optical axis of laser light is translated.

FIG. 10 is a schematic diagram showing a state when laser light is diffused. FIG. 11 is a schematic diagram showing a state when laser light is converged. FIG. 12 is a schematic diagram showing a state when an optical axis of laser light is skewed. FIG. 13 is a schematic diagram showing a state when the optical axis of laser light is translated. A direction of cut-off by each of mechanical shutter 142 and acousto-optic element 144 shown in FIGS. 10 to 13 is common, and laser light is cut off in one direction in each case. In other words, description will be given with reference to FIGS. 10 to 13 assuming that mechanical shutter 142 is cutting off the optical path in a manner the same as acousto-optic element 144 described with reference to FIGS. 6 and 7.

FIGS. 10 to 13 show with a dashed line, laser light B in the reference state and shows with a solid line, laser light B' in the abnormal state that deviates from the reference state. FIGS. 10 to 13 show relation in magnitude between delay time periods ta1 and ta2 and between change time periods tb1 and tb2, the time periods being obtained from first temporal change in each quantity of light, and between delay time periods Ta1 and Ta2 and between change time periods Tb1 and Tb2, the time periods being obtained from second temporal change in each quantity of light. A suffix "1" represents a result obtained from temporal change in quantity of light in the reference state and a suffix "2" represents a result obtained from temporal change in quantity of light in the abnormal state.

An example in which the optical axis is not displaced but laser light B is diffused like laser light B' will be described with reference to FIG. 10. Since the optical axis is not displaced, delay time period Ta1 and delay time period Ta2 obtained as a result of cut-off by acousto-optic element 144 are substantially the same as each other. Delay time period ta1 and delay time period ta2 obtained as a result of closing of mechanical shutter 142 are substantially the same as each other. Laser light B, on the other hand, is larger in diameter of light at a cross-section at a position of arrangement of acousto-optic element 144 than laser light B'. Therefore, change time period Tb1 obtained as a result of cut-off by acousto-optic element 144 is longer than change time period Tb2. Laser light B is smaller in diameter of light at a cross-section at a position of arrangement of mechanical shutter 142 than laser light B'. Therefore, change time period tb1 obtained as a result of closing of mechanical shutter 142 is shorter than change time period tb2.

An example in which the optical axis is not displaced but laser light B is converged like laser light B' will be described with reference to FIG. 11. As in FIG. 10, the optical axis is not displaced, and hence delay time period Ta1 and delay time period Ta2 obtained as a result of cut-off by acousto-optic element 144 are substantially the same as each other, and delay time period ta1 and delay time period ta2 obtained as a result of closing of mechanical shutter 142 are substantially the same as each other. Laser light B, on the other hand, is smaller in diameter of light at the cross-section at the position of arrangement of acousto-optic element 144 than laser light B'. Therefore, change time period Tb1 obtained as a result of cut-off by acousto-optic element 144 is shorter than change time period Tb2. Laser light B is larger in diameter of light at the cross-section at the position of arrangement of mechanical shutter 142 than laser light B'. Therefore, change time period tb1 obtained as a result of closing of mechanical shutter 142 is longer than change time period tb2.

As set forth above, when the optical axis is not displaced, delay time period ta found from first temporal change in quantity of light in the reference state and the abnormal state and delay time period Ta found from second temporal change in quantity of light do not vary. When the diameter of light varies, on the other hand, change time period tb found from first temporal change in quantity of light in the reference state and the abnormal state and change time period Tb found from second temporal change in quantity of light vary. Control device 180 can evaluate how the diameter of light varies along the direction of the optical path based on comparison between the result of evaluation of change time periods tb1 and tb2 found from first temporal change in quantity of light and the result of evaluation of change time periods Tb1 and Tb2 found from second temporal change in quantity of light. For example, control device 180 can evaluate whether laser light has been converged or diffused along the direction of the optical path and can further evaluate how much laser light has been converged or diffused.

An example in which the optical axis of laser light B is skewed like laser light B' without change in diameter of light will be described with reference to FIG. 12. Since the diameter of light at the cross-section at the position of arrangement of acousto-optic element 144 does not substantially vary, change time period Tb1 and change time period Tb2 obtained as a result of cut-off by acousto-optic element 144 are substantially the same as each other. Change time period tb1 and change time period tb2 obtained as a result of closing of mechanical shutter 142 are substantially the same as each other. The optical axis, on the other hand, is skewed and laser light B and laser light B' are different from each other in position of incidence on the optical shutter. The position of incidence of laser light B on acousto-optic element 144 is more distant from a source of generation of acoustic waves (the position of start of the shutter) than the position of incidence of laser light B' on acousto-optic element 144. Therefore, delay time period Ta1 obtained as a result of cut-off by acousto-optic element 144 is longer than delay time period Ta2. The position of incidence of laser light B on mechanical shutter 142 is closer to the shutter than the position of incidence of laser light B' on mechanical shutter 142. Therefore, delay time period ta1 obtained as a result of closing of mechanical shutter 142 is shorter than delay time period ta2.

An example in which the optical axis of laser light B is translated like laser light B' without change in diameter of light will be described with reference to FIG. 13. Since the diameter of light does not change as in FIG. 12, change time period Tb1 and change time period Tb2 obtained as a result of cut-off by acousto-optic element 144 are substantially the same as each other and change time period tb1 and change time period tb2 obtained as a result of closing of mechanical shutter 142 are substantially the same as each other. The optical axis, on the other hand, is translated toward the shutter. The positions of incidence of laser light B on acousto-optic element 144 and on mechanical shutter 142 are more distant from the shutter than the positions of incidence of laser light B' on acousto-optic element 144 and on mechanical shutter 142. Therefore, delay time period Ta1 obtained as a result of cut-off by acousto-optic element 144 is longer than delay time period Ta2 and delay time period ta1 obtained as a result of closing of mechanical shutter 142 is longer than delay time period ta2.

As set forth above, when the diameter of light does not vary, change time period tb found from first temporal change in quantity of light in the reference state and the abnormal state and change time period Tb found from second temporal change in quantity of light do not vary. When the optical axis is displaced, on the other hand, delay time period ta found from first temporal change in quantity of light in the reference state and the abnormal state and delay time period Ta found from second temporal change in quantity of light vary. Control device 180 can evaluate how the optical axis is displaced along the direction of the optical path based on comparison of the result of evaluation of delay time periods ta1 and ta2 found from first temporal change in quantity of light and the result of evaluation of delay time periods Ta1 and Ta2 found from second temporal change in quantity of light. For example, control device 180 can evaluate in which direction the optical axis is inclined along the direction of the optical path, can evaluate whether or not the optical axis has simply been translated, and can further evaluate how much the optical axis has moved.

[Aspects]

Embodiments described above are understood by a person skilled in the art as specific examples of aspects below.

(Clause 1) An evaluation method according to one aspect evaluates characteristics of laser light in an optical apparatus. The optical apparatus includes a laser light source that emits laser light, a detector that detects laser light, and an optical shutter that switches between irradiation of the detector with laser light and cut-off of laser light to the detector. The evaluation method includes transmitting to the optical shutter, an instruction to switch between irradiation and cut-off, obtaining temporal change in output from the detector during a period from transmission of the instruction until completion of switching, and evaluating characteristics of laser light based on the obtained temporal change.

According to the evaluation method according to Clause 1, since an optical component that has already been provided in the optical apparatus can be used to evaluate characteristics of laser light, cost and the size of the apparatus can be suppressed.

(Clause 2) In the evaluation method according to Clause 1, the evaluating characteristics further includes comparing the temporal change obtained during a first period and the temporal change obtained during a second period.

According to the evaluation method according to Clause 2, how characteristics of laser light have varied between the first period and the second period can be evaluated.

(Clause 3) In the evaluation method according to Clause 1 or 2, the evaluating characteristics further includes obtaining a first feature value corresponding to a position of incidence of laser light on the optical shutter based on the obtained temporal change.

According to the evaluation method according to Clause 3, characteristics about the position of incidence of laser light on the optical shutter can be evaluated.

(Clause 4) In the evaluation method according to Clause 3, the first feature value is a delay time period from transmission of the instruction until a rate of change in output value from the detector attains to a prescribed value, the rate of change being defined as a ratio of an amount of change from an initial value of an output value from the detector to a total amount of change from the initial value to an end value.

According to the evaluation method according to Clause 4, characteristics about the position of incidence of laser light on the optical shutter can be evaluated.

(Clause 5) In the evaluation method according to any one of Clauses 1 to 4, the evaluating characteristics further includes obtaining a second feature value corresponding to a light diameter of laser light at a position where the optical shutter is provided based on the obtained temporal change.

According to the evaluation method according to Clause 5, characteristics about the light diameter of laser light at the position where the optical shutter is provided can be evaluated.

(Clause 6) In the evaluation method according to Clause 5, the second feature value is a change time period until a rate of change in output value from the detector increases from a first value to a second value during a period from start of change in output value from the detector until the output value attains to the end value, the rate of change being defined as a ratio of an amount of change from an initial value of an output value from the detector to a total amount of change from the initial value to an end value.

According to the evaluation method according to Clause 6, characteristics about the light diameter of laser light at the position where the optical shutter is provided can be evaluated.

(Clause 7) In the evaluation method according to any one of Clauses 1 to 6, the optical shutter includes a first shutter and a second shutter. The transmitting an instruction further includes transmitting to the first shutter, an instruction to switch between irradiation and cut-off while the second shutter allows the laser light to advance and transmitting to the second shutter, an instruction to switch between irradiation and cut-off while the first shutter allows the laser light to advance. The obtaining temporal change further includes obtaining first temporal change in quantity of light detected by the detector during a period from transmission to the first shutter of the instruction for switching until completion of switching and obtaining second temporal change in quantity of light detected by the detector during a period from transmission to the second shutter of the instruction for switching until completion of switching. The evaluating characteristics evaluates characteristics of laser light along an optical path of laser light based on the first temporal change and the second temporal change.

According to the evaluation method according to Clause 7, characteristics along the optical path of laser light can be evaluated.

(Clause 8) An atomic clock apparatus according to one aspect includes an atom generator that radiates atomic beams or ionized atoms, a plurality of light source apparatuses that irradiate the atoms radiated from the atom generator with laser light, a detector that detects laser light emitted from each of the plurality of light source apparatuses before the atoms are irradiated with laser light, and a control device. Each of the plurality of light source apparatuses includes a laser light source that emits laser light and an optical shutter that switches between irradiation of the detector with laser light and cut-off of laser light to the detector. For each of the plurality of light source apparatuses, the control device transmits to the optical shutter, an instruction to switch between irradiation and cut-off, obtains temporal change in output from the detector during a period from transmission of the instruction until completion of switching, and evaluates characteristics of laser light based on the obtained temporal change.

According to the atomic clock apparatus according to Clause 8, since an optical component that has already been provided in the atomic clock apparatus can be used to evaluate characteristics of laser light emitted from each of a plurality of laser light sources, cost and the size of the apparatus can be suppressed. Furthermore, since characteristics of laser light can be monitored, stable operations of the atomic clock apparatus for a long time can be realized.

(Clause 9) In the atomic clock apparatus described in Clause 8, the optical shutter is a mechanical shutter or an acousto-optic element.

(Clause 10) A program according to one aspect is a program for causing a computer to perform the method according to any one of Clauses 1 to 7.

(Clause 11) In a computer readable medium according to one aspect, the program according to Clause 10 is stored.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. An evaluation method of evaluating characteristics of laser light in an optical apparatus, the optical apparatus including a laser light source that emits laser light, a detector that detects laser light, and an optical shutter that switches between irradiation of the detector with laser light and cut-off of laser light to the detector, the evaluation method comprising:
   transmitting to the optical shutter, an instruction to switch between irradiation and cut-off;
   obtaining temporal change in output from the detector during a period from transmission of the instruction until completion of switching; and
   evaluating characteristics of laser light based on the obtained temporal change,
   wherein the evaluating characteristics further includes obtaining a first feature value corresponding to a position of incidence of laser light on the optical shutter based on the obtained temporal change.

2. The evaluation method according to claim 1, wherein the evaluating characteristics further includes comparing the temporal change obtained during a first period and the temporal change obtained during a second period.

3. The evaluation method according to claim 1, wherein the first feature value is a delay time period from transmission of the instruction until a rate of change in output value from the detector attains a prescribed value, the rate of change being defined as a ratio of an amount of change from an initial value of an output value from the detector to a total amount of change from the initial value to an end value.

4. An evaluation method of evaluating characteristics of laser light in an optical apparatus, the optical apparatus including a laser light source that emits laser light, a detector that detects laser light, and an optical shutter that switches between irradiation of the detector with laser light and cut-off of laser light to the detector, the evaluation method comprising: transmitting to the optical shutter, an instruction to switch between irradiation and cut-off; obtaining temporal change in output from the detector during a period from transmission of the instruction until completion of switching; and evaluating characteristics of laser light based on the obtained temporal change, wherein the evaluating characteristics further includes obtaining a feature value corresponding to a light diameter of laser light at a position where the optical shutter is provided, based on the obtained temporal change.

5. The evaluation method according to claim 4, wherein the feature value is a change time period until a rate of change in output value from the detector increases from a first value to a second value during a period from start of change in output value from the detector until the output value attains an end value, the rate of change being defined as a ratio of an amount of change from an initial value of an output value from the detector to a total amount of change from the initial value to an end value.

6. The evaluation method according to claim 1, wherein the optical shutter includes a first shutter and a second shutter,
   the transmitting an instruction further includes
   transmitting to the first shutter, an instruction to switch between irradiation and cut-off while the second shutter allows the laser light to advance, and transmitting to the second shutter, an instruction to switch between irradiation and cut-off while the first shutter allows the laser light to advance, the obtaining temporal change further includes obtaining first temporal change in output from the detector during a period from transmission to the first shutter of the instruction for switching until completion of switching, and obtaining second temporal change in output from the detector during a period from transmission to the second shutter of the instruction for switching until completion of switching, and the evaluating characteristics evaluates characteristics of laser light along an optical path of laser light based on the first temporal change and the second temporal change.

7. An atomic clock apparatus comprising:

an atom generator that radiates atomic beams or ionized atoms;

a plurality of light source apparatuses that irradiate the atoms radiated from the atom generator with laser light;

a detector that detects laser light emitted from each of the plurality of light source apparatuses before the atoms are irradiated with laser light; and a control device, wherein each of the plurality of light source apparatuses includes a laser light source that emits laser light, and an optical shutter that switches between irradiation of the detector with laser light and cut-off of laser light to the detector, and for each of the plurality of light source apparatuses, the control device transmits to the optical shutter, an instruction to switch between irradiation and cut-off, obtains temporal change in output from the detector during a period from transmission of the instruction until completion of switching, and evaluates characteristics of laser light based on the obtained temporal change.

8. The atomic clock apparatus according to claim 7, wherein the optical shutter is a mechanical shutter or an acousto-optic element.

* * * * *